(12) United States Patent
Wakita

(10) Patent No.: US 9,636,844 B2
(45) Date of Patent: *May 2, 2017

(54) CUTTING APPARATUS

(71) Applicant: DISCO CORPORATION, Tokyo (JP)

(72) Inventor: Nobuhiko Wakita, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 316 days.

This patent is subject to a terminal disclaimer.

(21) Appl. No.: 14/333,016

(22) Filed: Jul. 16, 2014

(65) Prior Publication Data

US 2015/0020666 A1  Jan. 22, 2015

(30) Foreign Application Priority Data

Jul. 18, 2013 (JP) ................................. 2013-149698

(51) Int. Cl.

| B26D 7/26 | (2006.01) |
|---|---|
| B28D 5/02 | (2006.01) |
| B23B 31/30 | (2006.01) |
| B28D 5/00 | (2006.01) |
| B24B 45/00 | (2006.01) |
| B27B 5/30 | (2006.01) |
| B27B 5/32 | (2006.01) |
| B24B 27/06 | (2006.01) |

(52) U.S. Cl.

CPC .............. *B28D 5/02* (2013.01); *B23B 31/307* (2013.01); *B24B 27/06* (2013.01); *B24B 45/00* (2013.01);

(Continued)

(58) Field of Classification Search

CPC ....... B23B 31/307; B26D 7/2621; B27B 5/32; B24B 45/00

(Continued)

(56) References Cited

U.S. PATENT DOCUMENTS 3,167,992 A * 2/1965 Kury .................... B26D 7/2614
                                                        248/363
3,454,282 A * 7/1969 Boulton ................. B21D 51/46
                                                        118/55

(Continued)

FOREIGN PATENT DOCUMENTS

| EP | 0 027 958 | 5/1981 |
|---|---|---|
| JP | 11-033907 | 2/1999 |

(Continued)

OTHER PUBLICATIONS

U.S. Appl. No. 14/333,170, filed Jul. 16, 2014.
U.S. Appl. No. 14/336,148, filed Jul. 21, 2014.

*Primary Examiner* — Kenneth E Peterson
(74) *Attorney, Agent, or Firm* — Greer Burns & Crain Ltd.

(57) ABSTRACT

A cutting unit includes a spindle, a spindle housing, a support flange on the front of the spindle, a cutting blade detachably supported to the support flange, and a fixing flange for fixing the cutting blade to the support flange. The support flange includes a boss portion adapted to be inserted through a central opening of the cutting blade, a flange portion for supporting one side surface of the cutting blade, and a cylindrical portion for engaging the front of the spindle. The flange portion has a suction hole opening toward the fixing flange, and the cylindrical portion has a communication hole communicating with the suction hole. The communication hole is connected to a vacuum source through a rotary joint fixed to the spindle housing so that communication between the communication hole and the vacuum source is selectively made by an on-off valve.

3 Claims, 4 Drawing Sheets

(52) U.S. Cl.
CPC ............. *B26D 7/2621* (2013.01); *B27B 5/30* (2013.01); *B27B 5/32* (2013.01); *B28D 5/0082* (2013.01); *B28D 5/022* (2013.01); *Y10T 83/647* (2015.04); *Y10T 83/9379* (2015.04)

(58) Field of Classification Search
USPC .......................... 83/665, 666, 698.41; 279/3
See application file for complete search history.

(56) References Cited

U.S. PATENT DOCUMENTS

| | | | |
|---|---|---|---|
| 4,878,407 A * | 11/1989 | Harrison | B26D 7/2614 101/216 |
| 5,104,370 A * | 4/1992 | Yerly | B26D 7/2614 100/35 |
| 5,218,790 A | 6/1993 | Huang | |
| 6,030,326 A | 2/2000 | Azuma et al. | |
| 6,148,526 A * | 11/2000 | Kirn | B24B 45/006 30/337 |
| 6,341,600 B1 | 1/2002 | Wakita | |
| 6,358,115 B1 | 3/2002 | Koike et al. | |
| 2006/0121840 A1 * | 6/2006 | Kim | B24B 45/00 451/342 |
| 2015/0020667 A1 | 1/2015 | Wakita | |

FOREIGN PATENT DOCUMENTS

| | | |
|---|---|---|
| JP | 2007-216377 | 8/2007 |
| JP | 2009099940 | 5/2009 |
| JP | 2009119569 | 6/2009 |
| JP | 2011-31374 | 2/2011 |
| JP | 2011104726 | 6/2011 |

\* cited by examiner

CUTTING APPARATUS

BACKGROUND OF THE INVENTION

Field of the Invention

The present invention relates to a cutting apparatus for cutting a workpiece such as a semiconductor wafer, and more particularly to a mounting mechanism for a cutting blade in the cutting apparatus.

Description of the Related Art

A plurality of devices such as ICs and LSIs are respectively formed in a plurality of separate regions as defined by a plurality of division lines on the front side of a semiconductor wafer. The semiconductor wafer thus having the plural devices is divided into individual device chips by using a cutting apparatus having a cutting blade. The device chips are widely used in various electric equipment such as mobile phones and personal computers. The cutting apparatus includes a chuck table for holding a workpiece, cutting means for cutting the workpiece held on the chuck table, and feeding means for relatively feeding the chuck table and the cutting means, whereby the workpiece such as a wafer can be divided into the individual device chips with high accuracy.

The cutting means includes a spindle adapted to be rotationally driven by a motor, a spindle housing for rotatably supporting the spindle, a support flange mounted on the front end portion of the spindle, a cutting blade detachably supported to the support flange, and a fixing flange for fixing the cutting blade supported to the support flange. The support flange has a boss portion adapted to be inserted through a central opening of the cutting blade, a flange portion formed integrally with the outer circumference of the boss portion for supporting one side surface of the cutting blade, and an external screw thread formed at the front end of the boss portion, wherein the cutting blade and the fixing flange (pressing flange) are fitted to the boss portion of the support flange and a nut is threadedly engaged with the external screw thread of the boss portion of the support flange until tightened, thereby firmly holding the cutting blade between the support flange and the fixing flange (see Japanese Patent Laid-open No. Hei 11-33907, for example).

SUMMARY OF THE INVENTION

In general, to prevent the fixing flange from loosening due to the rotation of the spindle in performing the cutting operation, the spiral structure of the screw threads in the support flange and the nut is reverse to the rotational direction of the spindle. Accordingly, as the cutting operation is continued, the nut is firmly tightened to the external screw thread of the support flange without loosening. As a result, in the case of replacing the cutting blade, large torque is required to remove the nut. However, when the cutting blade is worn or chipped, it may be replaced with a new one and this replacement of the cutting blade with respect to the support flange is made relatively frequently. In the conventional mounting structure for the cutting blade, large torque is required to remove the nut as mentioned above, so that there is a problem that the production efficiency may be reduced.

It is therefore an object of the present invention to provide a cutting apparatus which allows an operator to efficiently replace the cutting blade with respect to the support flange.

In accordance with an aspect of the present invention, there is provided a cutting apparatus including: a chuck table for holding a workpiece; cutting means for cutting the workpiece held on the chuck table; and feeding means for relatively feeding the chuck table and the cutting means; the cutting means including a spindle, a spindle housing for rotatably supporting the spindle, a support flange mounted on the front end portion of the spindle, a cutting blade detachably supported to the support flange, and a fixing flange for fixing the cutting blade supported to the support flange; the support flange including a boss portion adapted to be inserted through a central opening of the cutting blade, a flange portion formed integrally with the outer circumference of the boss portion, the flange portion having an annular supporting surface for supporting one side surface of the cutting blade, and a cylindrical portion for engaging the front end portion of the spindle; the flange portion of the support flange being formed with a suction hole opening toward the fixing flange, the cylindrical portion of the support flange being formed with a communication hole communicating with the suction hole; the communication hole being connected to a vacuum source through a rotary joint fixed to the spindle housing so that the communication between the communication hole and the vacuum source is selectively made by an on-off valve, whereby when the on-off valve is opened to make the communication between the communication hole and the vacuum source, a reduced pressure is applied between the support flange and the fixing flange to suck the fixing flange toward the support flange, thereby fixing the cutting blade between the support flange and the fixing flange; the fixing flange having an engaging hole adapted to be engaged with the boss portion of the support flange and an annular pressing surface for pressing the other side surface of the cutting blade; at least the annular supporting surface of the support flange being formed with fine asperities for improving the friction to the cutting blade.

Preferably, the annular pressing surface of the fixing flange is formed with fine asperities for improving the friction to the cutting blade. Preferably, the cutting apparatus further includes a pressure gauge provided between the rotary joint and the vacuum source for measuring the reduced pressure; and a safety unit for outputting a danger signal when the reduced pressure measured by the pressure gauge becomes greater than a predetermined value.

According to the present invention, the on-off valve is opened to make the communication between the suction hole and the vacuum source in performing the cutting operation. As a result, the fixing flange is sucked toward the support flange to thereby firmly hold the cutting blade between the support flange and the fixing flange under suction. Furthermore, the cutting blade can be stably fixed by the fine asperities formed on the annular supporting surface of the support flange. In the case of replacing the cutting blade, the on-off valve is closed to cancel the suction holding of the fixing flange. Accordingly, the fixing flange can be easily removed from the support flange, so that the cutting blade can be efficiently replaced with a new one.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
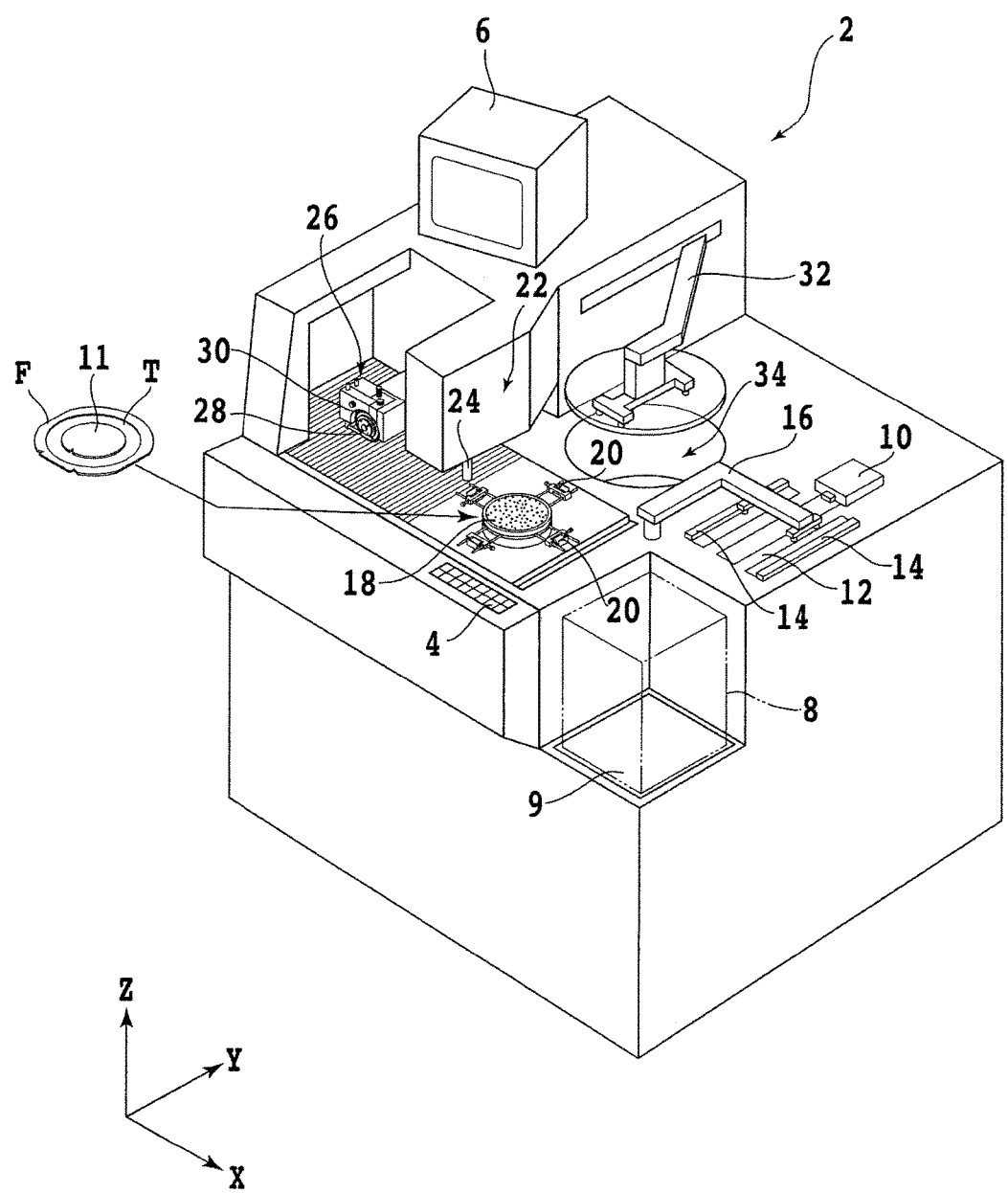
FIG. 1 is a perspective view of a cutting apparatus according to a preferred embodiment of the present invention.

A preferred embodiment of the present invention will now be described in detail with reference to the drawings. Referring to FIG. 1, there is shown a perspective view of a cutting apparatus 2 including a mounting mechanism for a cutting blade according to this preferred embodiment. The cutting apparatus 2 includes an operation panel 4 for allowing an operator to input instructions such as processing conditions to the apparatus 2. The operation panel 4 is provided at the front portion of the cutting apparatus 2. The cutting apparatus 2 further includes a display unit 6 such as a CRT for displaying a guide view to the operator or an image obtained by an imaging unit to be hereinafter described. The display unit 6 is provided at the upper portion of the cutting apparatus 2.

A semiconductor wafer (which will be hereinafter referred to also simply as wafer) 11 is a workpiece to be cut by the cutting apparatus 2. The wafer 11 is preliminarily attached to a dicing tape T supported to an annular frame F. A plurality of such wafers 11 each supported through the dicing tape T to the annular frame F are stored in a wafer cassette 8. The wafer cassette 8 is placed on a vertically movable cassette elevator 9. A wafer handling unit 10 is provided on the rear side of the wafer cassette 8 to take a desired one of the plural wafers 11 out of the cassette 8 before cutting and also bring back the wafer 11 into the cassette 8 after cutting.

A temporary placing area 12 for temporarily placing the wafer 11 to be handled by the wafer handling unit 10 is provided between the wafer cassette 8 and the wafer handling unit 10. A positioning mechanism (a pair of centering guides) 14 for positioning the wafer 11 at a fixed position is provided in the temporary placing area 12. A first transfer unit 16 having a pivotable arm for transferring the wafer 11 held under suction is provided near the temporary placing area 12. The wafer 11 taken out of the wafer cassette 8 and positioned in the temporary placing area 12 is transferred to a chuck table 18 by the first transfer unit 16. The wafer 11 transferred to the chuck table 18 is held on the chuck table 18 under suction.

The chuck table 18 is rotatable by a motor (not shown) and movable in the X direction by a feeding mechanism (not shown). An alignment unit 22 for detecting a subject area of the wafer 11 to be cut is provided above the path of movement of the chuck table 18 in the X direction. The chuck table 18 is provided with a plurality of clamps 20 for clamping the annular frame F supporting the wafer 11 held on the chuck table 18. The alignment unit 22 includes an imaging unit 24 for imaging the front side of the wafer 11. According to an image obtained by the imaging unit 24, the alignment unit 22 can detect the subject area of the wafer 11 by performing image processing such as pattern matching. The image obtained by the imaging unit 24 is displayed by the display unit 6.

A cutting unit 26 for cutting the wafer 11 held on the chuck table 18 is provided on the left side of the alignment unit 22 as viewed in FIG. 1. The cutting unit 26 is integrated with the alignment unit 22, so that they are movable together in the Y direction and the Z direction. The cutting unit 26 includes a rotatable spindle 28 and a cutting blade 30 mounted on the front end of the spindle 28. The cutting unit 26 is movable in the Y direction and the Z direction. The cutting blade 30 is set on an extension line extending from the imaging unit 24 in the X direction. The movement of the cutting unit 26 in the Y direction is achieved by an indexing mechanism (not shown).

Reference numeral 34 denotes a spinner cleaning unit for cleaning the wafer 11 after cutting. The wafer 11 after cutting is transferred from the chuck table 18 to the spinner cleaning unit 34 by a second transfer unit 32 and next subjected to spin cleaning and spin drying in the spinner cleaning unit 34.

Figure 2:
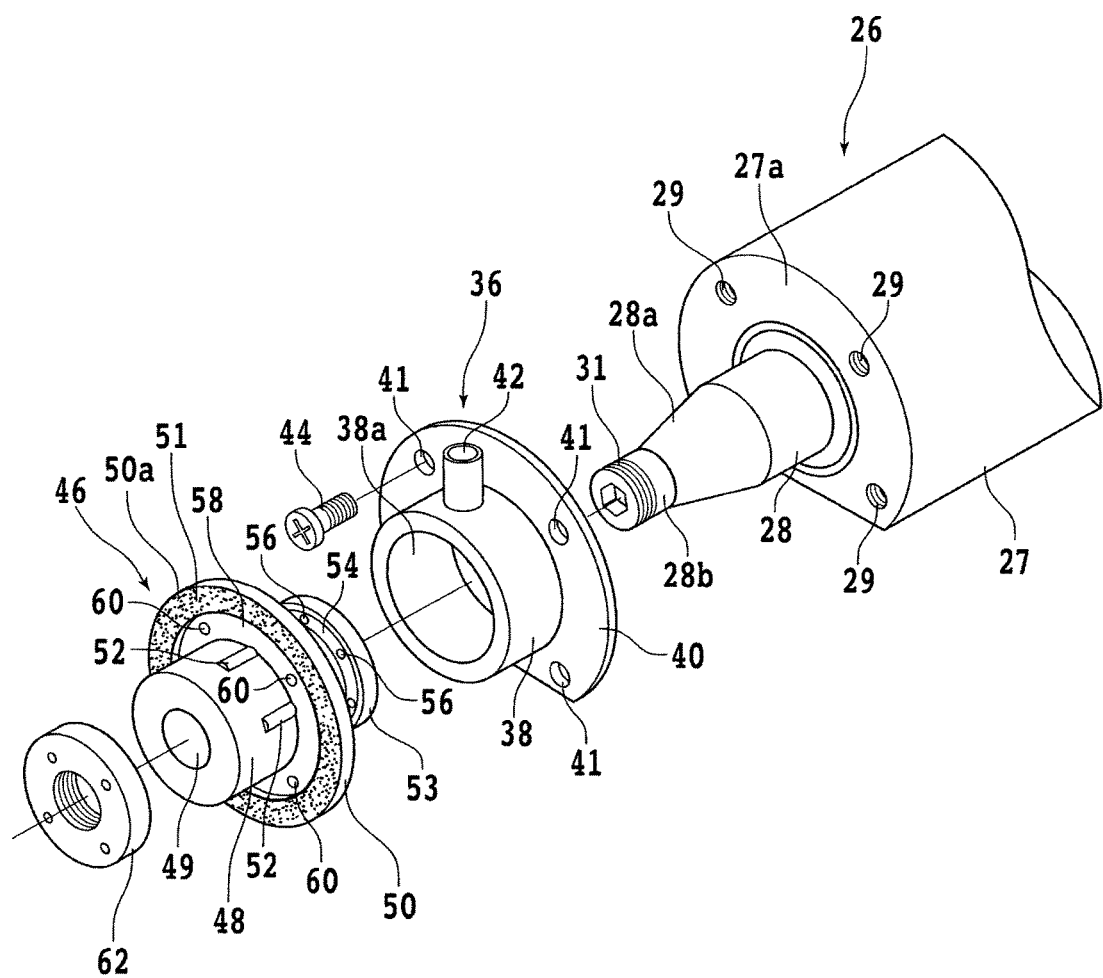
FIG. 2 is an exploded perspective view showing a manner of mounting a support flange on the front end portion of a spindle.

FIG. 2 is an exploded perspective view showing a manner of mounting a support flange 46 to the front end portion of the spindle 28. The spindle 28 of the cutting unit 26 is rotatably supported to a spindle housing 27 by air bearing. The spindle 28 has a tapering portion 28a and a small-diameter portion 28b extending from the front end of the tapering portion 28a. The small-diameter portion 28b is formed with an external screw thread 31. The external screw thread 31 has a spiral structure reverse to the rotational direction of the spindle 28. The spindle housing 27 has an end surface 27a from which the spindle 28 projects. The end surface 27a of the spindle housing 27 is formed with a plurality of tapped holes 29.

Figure 3A:
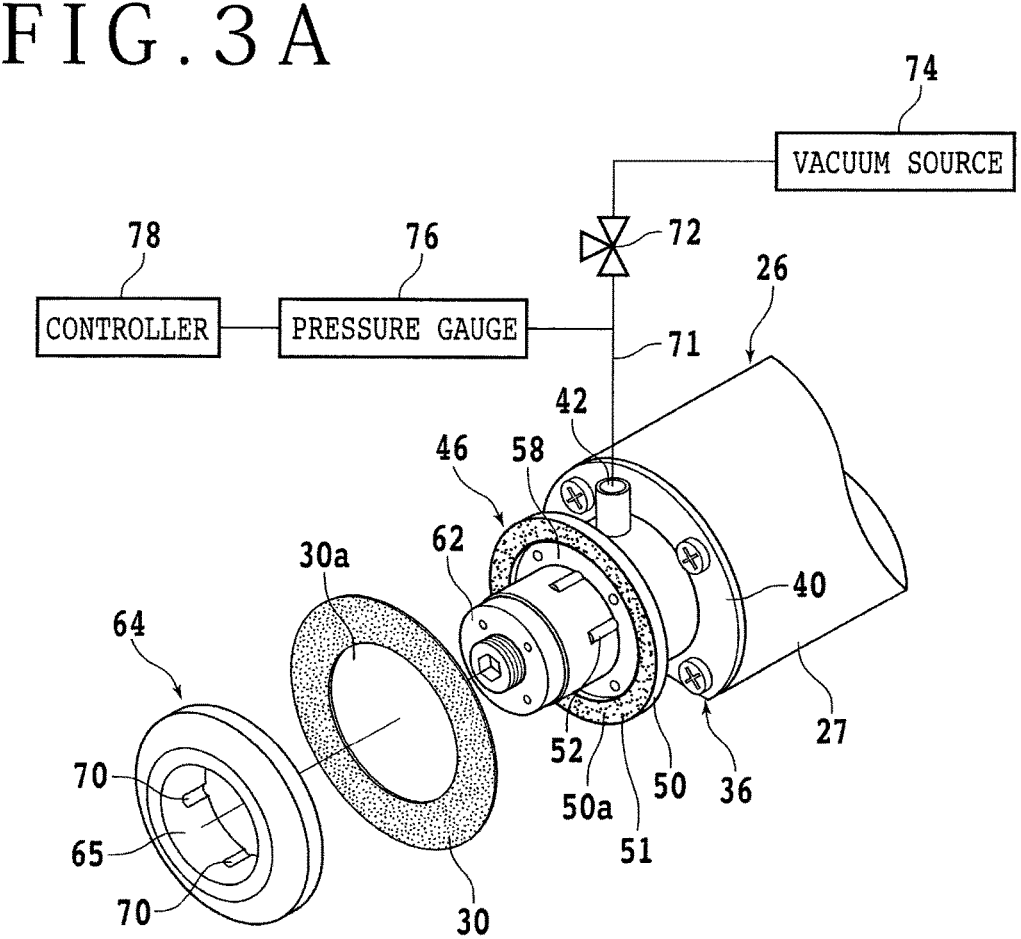
FIG. 3A is an exploded perspective view showing a manner of mounting a cutting blade on the support flange with a fixing flange.

Reference numeral 36 denotes a rotary joint, which is composed of a cylindrical boss portion 38 and a flange portion 40 formed integrally with the outer circumference of the boss portion 38. The boss portion 38 has an insertion hole 38a and a pipe 42 having one end opening to the insertion hole 38a. As shown in FIG. 3A, the pipe 42 is connected with a vacuum source 74 in such a manner that the communication between the pipe 42 and the vacuum source 74 is selectively made by an on-off valve 72. The flange portion 40 of the rotary joint 36 is formed with a plurality of mounting holes 41. A plurality of screws 44 are inserted through the mounting holes 41 of the rotary joint 36 and threadedly engaged with the tapped holes 29 formed on the end surface 27a of the spindle housing 27 until tightened, thereby mounting the rotary joint 36 to the end surface 27a of the spindle housing 27.

Reference numeral 46 denotes a support flange for supporting the cutting blade 30. The support flange 46 is composed of a boss portion 48 having an engaging hole 49, a flange portion 50 formed integrally with the outer circumference of the boss portion 48, and a cylindrical portion 53 adapted to be engaged with the front end portion of the spindle 28. The outer circumference of the boss portion 48 is formed with a plurality of projections 52 uniformly spaced apart from each other in the circumferential direction of the boss portion 48. The flange portion 50 has an annular supporting surface 50a and an annular groove 58. The annular supporting surface 50a is adapted to abut against one side surface of the cutting blade 30 through which the boss portion 48 is inserted, thereby supporting the cutting blade 30. A plurality of suction holes 60 open to the bottom of the annular groove 58. The plural suction holes 60 are uniformly spaced apart from each other in the circumferential direction of the annular groove 58. The annular supporting surface 50*a* of the flange portion 50 is formed with fine asperities 51 for improving the friction to the cutting blade 30, i.e., for increasing a frictional force between the cutting blade 30 and the support flange 46.

The cylindrical portion 53 of the support flange 46 is formed with an annular groove 54. A plurality of communication holes 56 open to the bottom of the annular groove 54. The plural communication holes 56 are uniformly spaced apart from each other in the circumferential direction of the annular groove 54. As apparent from FIG. 4B, the suction holes 60 and the communication holes 56 are connected to each other through a plurality of communication passages 57 formed in the boss portion 50 and the cylindrical portion 53.

As shown in FIG. 3A, a pressure gauge 76 is provided in a suction passage 71 connecting the pipe 42 and the vacuum source 74. The pressure gauge 76 is connected to a controller (safety unit) 78. When the on-off valve 72 is opened, a vacuum is produced by the vacuum source 74 in a portion of the suction passage 71 between the pipe 42 and the on-off valve 72. This vacuum is measured by the pressure gauge 76. When the pressure measured by the pressure gauge 76 exceeds a predetermined value (e.g., 0.02 MPa), the controller 78 having dedicated software determines that there is a danger and then outputs a danger signal to immediately stop the cutting operation. Since the atmospheric pressure is 0.1 MPa, the predetermined value of 0.02 MPa is a vacuum.

After engaging the support flange 46 with the tapering portion 28*a* and the small-diameter portion 28*b* of the spindle 28, a nut 62 is threadedly engaged with the external screw thread 31 of the spindle 28 until tightened, thereby fixing the support flange 46 to the front end portion of the spindle 28 as shown in FIG. 3A. After fixing the support flange 46 to the front end portion of the spindle 28, the boss portion 48 of the support flange 46 is inserted through a central opening 30*a* of the cutting blade 30. Thereafter, a fixing flange (pressing flange) 64 having an engaging hole 65 is fitted to the boss portion 48 of the support flange 46. That is, the boss portion 48 of the support flange 46 is closely inserted through the engaging hole 65 of the fixing flange 64 in the condition where the cutting blade 30 is sandwiched between the support flange 46 and the fixing flange 64. The cutting blade 30 is a washer blade such as a resinoid blade obtained by bonding diamond abrasive grains with a resin bond, a vitrified bond blade obtained by bonding diamond abrasive grains with a vitrified bond, or an electroformed blade obtained by bonding diamond abrasive grains with a nickel plating.

Figure 3B:
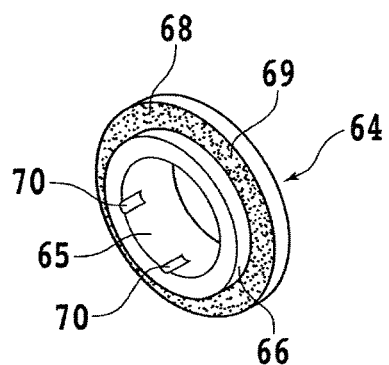
FIG. 3B is a perspective view of the fixing flange as viewed from the back side thereof.

A plurality of recesses 70 are formed on the inner circumference of the engaging hole 65 of the fixing flange 64 so as to be uniformly spaced apart from each other in the circumferential direction of the fixing flange 64. The plural recesses 70 of the fixing flange 64 respectively correspond to the plural projections 52 formed on the boss portion 48 of the support flange 46. In fitting the fixing flange 64 to the boss portion 48 of the support flange 46, the fixing flange 64 is circumferentially positioned so that the recesses 70 are respectively engaged with the projections 52. Thereafter, the boss portion 48 of the support flange 46 is inserted through the engaging hole 65 of the fixing flange 64. Accordingly, the projections 52 of the support flange 46 and the recesses 70 of the fixing flange 64 cooperate to form a rotation restricting portion for restricting relative rotation of the support flange 46 and the fixing flange 64. FIG. 3B is a perspective view showing the back side of the fixing flange 64. As shown in FIG. 3B, the fixing flange 64 has an annular supporting surface 66 for supporting the inner circumference of the cutting blade 30 through which the boss portion 48 of the support flange 46 is inserted and an annular pressing surface 68 for pressing the other side surface of the cutting blade 30. The annular pressing surface 68 is formed with fine asperities 69 for improving the friction to the cutting blade 30, i.e., for increasing a frictional force between the cutting blade 30 and the fixing flange 64.

Figure 4A:
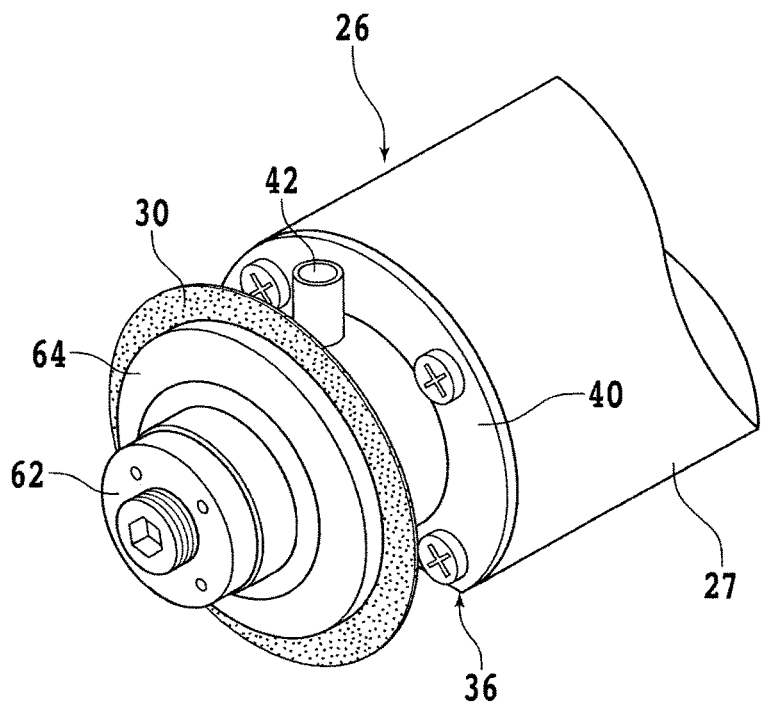
FIG. 4A is a perspective view showing a condition that the cutting blade and the fixing flange are fixed to the support flange.
Figure 4B:
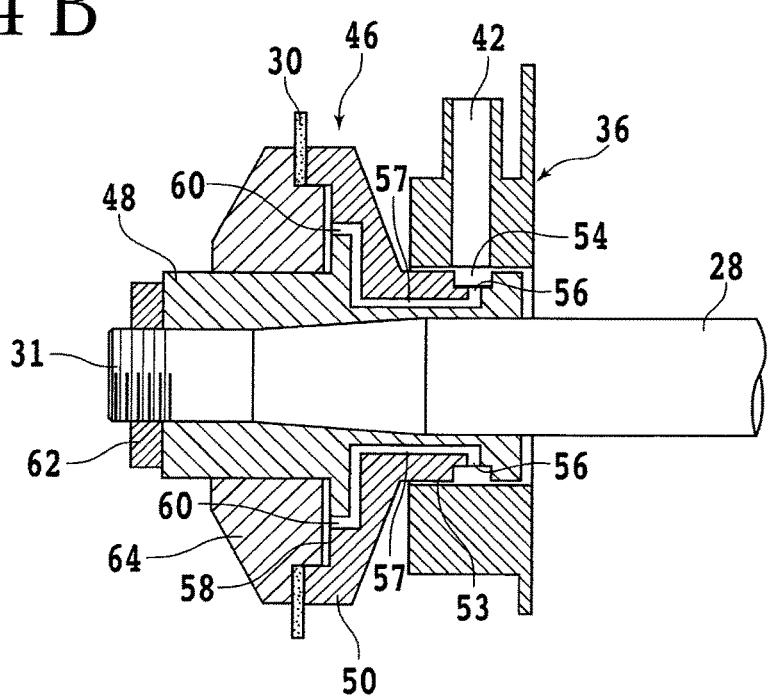
FIG. 4B is a sectional view of FIG. 4A as taken along the axis of the spindle.

FIG. 4A is a perspective view showing a condition that the cutting blade 30 and the fixing flange 64 are fitted to the boss portion 48 of the support flange 46, and FIG. 4B is a sectional view of FIG. 4A as taken along the axis of the spindle 28. When the on-off valve 72 shown in FIG. 3A is opened to make the communication between the pipe 42 and the vacuum source 74, a vacuum is applied through the annular groove 54, the communication holes 56, the communication passages 57, and the suction holes 60 of the support flange 46 to the annular groove 58 of the support flange 46, so that the fixing flange 64 is sucked toward the support flange 46. Accordingly, the cutting blade 30 is firmly held between the supporting surface 50*a* of the flange portion 50 of the support flange 46 and the pressing surface 68 of the fixing flange 64. In particular, the supporting surface 50*a* of the flange portion 50 of the support flange 46 has the fine asperities 51 for improving the friction to the cutting blade 30, and the pressing surface 68 of the fixing flange 64 has the fine asperities 69 for improving the friction to the cutting blade 30. Accordingly, the cutting blade 30 can be stably fixed.

When the pressure in the suction passage 71 as measured by the pressure gauge 76 is less than or equal to the predetermined value mentioned above, the vacuum applied to the annular groove 58 of the flange portion 50 is sufficiently large, so that the cutting blade 30 is firmly held between the supporting surface 50*a* of the flange portion 50 and the pressing surface 68 of the fixing flange 64 by a sufficiently large suction force. Accordingly, there is no trouble in cutting a workpiece with the cutting blade 30. However, when the pressure in the suction passage 71 becomes greater than the predetermined value mentioned above, the vacuum applied to the annular groove 58 of the flange portion 50 becomes insufficient, so that the fixation of the cutting blade 30 becomes insufficient in continuing the cutting operation. Accordingly, in the case that the pressure gauge 76 detects a pressure greater than the predetermined value, the controller 78 outputs a danger signal to immediately stop the cutting operation for the workpiece.

In the case that the cutting blade 30 is worn or chipped and it may be replaced with a new cutting blade, the on-off valve 72 is closed to interrupt the vacuum applied to the annular groove 58 of the flange portion 50. Accordingly, the suction holding of the fixing flange 64 by the vacuum is canceled, so that the fixing flange 64 and the cutting blade 30 can be easily removed from the boss portion 48 of the support flange 46.

According to one feature of the mounting mechanism for the cutting blade in this preferred embodiment, the rotary joint 36 is used to introduce a vacuum. That is, by fixing the rotary joint 36 to the end surface 27*a* of the spindle housing 27, a vacuum can be introduced into the annular groove 58 of the flange portion 50 of the support flange 46. Accordingly, it is unnecessary to largely change the structure of the spindle and the spindle housing in a conventional cutting apparatus, but it is only necessary to slightly change the end surface of the spindle housing in the conventional cutting apparatus, whereby the fixation of the fixing flange by the use of a nut in the conventional cutting apparatus can be easily changed to the fixation of the fixing flange 64 by a vacuum.

In the preferred embodiment mentioned above, a vacuum is introduced through the rotary joint 36 into the annular groove 58 formed on the flange portion 50 of the support flange 46, thereby firmly holding the cutting blade 30 between the supporting surface 50a of the flange portion 50 of the support flange 46 and the pressing surface 68 of the fixing flange 64, wherein the supporting surface 50a of the flange portion 50 of the support flange 46 has the fine asperities 51, and the pressing surface 68 of the fixing flange 64 has the fine asperities 69. Furthermore, the projections 52 formed on the boss portion 48 of the support flange 46 are engaged with the recesses 70 formed on the inner surface of the engaging hole 65 of the fixing flange 64, thereby forming the rotation restricting portion. Accordingly, the cutting blade 30 can be reliably fixed between the support flange 46 and the fixing flange 64 without using a nut. In the case of replacing the cutting blade 30, the fixing flange 64 can be easily removed from the support flange 46 by closing the on-off valve 72, so that the cutting blade 30 can be efficiently replaced with a new one.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A cutting apparatus comprising:
   a chuck table for holding a workpiece;
   cutting means for cutting said workpiece held on said chuck table; and
   feeding means for relatively feeding said chuck table and said cutting means;
   said cutting means including a spindle, a spindle housing for rotatably supporting said spindle, a support flange mounted on the front end portion of said spindle, a cutting blade detachably supported to said support flange, and a fixing flange for fixing said cutting blade supported to said support flange;
   said support flange including a boss portion adapted to be inserted through a central opening of said cutting blade, a flange portion formed integrally with the outer circumference of said boss portion, said flange portion having an annular supporting surface for supporting one side surface of said cutting blade, and a cylindrical portion for engaging the front end portion of said spindle;
   said flange portion of said support flange being formed with a suction hole opening toward said fixing flange, said cylindrical portion of said support flange being formed with a communication hole communicating with said suction hole;
   said communication hole being connected to a vacuum source through a rotary joint fixed to said spindle housing so that the communication between said communication hole and said vacuum source is selectively made by an on-off valve, whereby when said on-off valve is opened to make the communication between said communication hole and said vacuum source, a reduced pressure is applied between said support flange and said fixing flange to suck said fixing flange toward said support flange, thereby fixing said cutting blade between said support flange and said fixing flange;
   said fixing flange having an engaging hole adapted to be engaged with said boss portion of said support flange and an annular pressing surface for pressing the other side surface of said cutting blade;
   at least said annular supporting surface of said support flange being formed with fine asperities for improving the friction to said cutting blade.

2. The cutting apparatus according to claim 1, wherein said annular pressing surface of said fixing flange is formed with fine asperities for improving the friction to said cutting blade.

3. The cutting apparatus according to claim 1, further comprising:
   a pressure gauge provided between said rotary joint and said vacuum source for measuring said reduced pressure; and
   a safety unit for outputting a danger signal when said reduced pressure measured by said pressure gauge becomes greater than a predetermined value.

* * * * *